United States Patent
Goold et al.

(10) Patent No.: US 9,587,705 B2
(45) Date of Patent: Mar. 7, 2017

(54) ISOLATORS INCLUDING MAIN SPRING LINEAR GUIDE SYSTEMS

(71) Applicant: HONEYWELL INTERNATIONAL INC., Morristown, NJ (US)

(72) Inventors: Ryan Goold, Glendale, AZ (US); Paul Buchele, Glendale, AZ (US); Timothy Hindle, Peoria, AZ (US); Dale Thomas Ruebsamen, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/807,551

(22) Filed: Jul. 23, 2015

(65) Prior Publication Data

US 2017/0023092 A1 Jan. 26, 2017

(51) Int. Cl.
F16F 15/02 (2006.01)
F16F 1/02 (2006.01)
F16F 13/00 (2006.01)

(52) U.S. Cl.
CPC .............. *F16F 15/022* (2013.01); *F16F 1/02* (2013.01); *F16F 13/007* (2013.01)

(58) Field of Classification Search
CPC ...... F16F 1/02; F16F 1/04; F16F 1/041; F16F 1/046; F16F 3/02; F16F 3/04; F16F 13/007; F16F 15/022
USPC ....... 267/195, 201, 202, 203, 217, 221, 225, 267/226; 248/565, 566, 576, 575, 636, 248/638
See application file for complete search history.

(56) References Cited

U.S. PATENT DOCUMENTS

| | | | |
|---|---|---|---|
| 3,743,059 A | 7/1973 | Morse et al. | |
| 4,893,799 A | 1/1990 | de Fontenay | |
| 4,919,400 A | 4/1990 | Tabata et al. | |
| 5,044,648 A * | 9/1991 | Knapp | B62J 1/06 |
| | | | 188/322.17 |
| 5,184,803 A | 2/1993 | Tanabe et al. | |
| 5,332,070 A * | 7/1994 | Davis | F16F 9/16 |
| | | | 188/280 |
| 5,397,113 A | 3/1995 | Kojima et al. | |

(Continued)

FOREIGN PATENT DOCUMENTS

| | | |
|---|---|---|
| GB | 1240894 | 7/1971 |
| JP | 3181635 | 8/1991 |
| WO | 2015004701 | 1/2015 |

OTHER PUBLICATIONS

Korane, K.; "Machine Design," Hydraulic Accumulators Tame Shock and Vibration, May 1, 2015.

(Continued)

*Primary Examiner* — Thomas J Williams
(74) *Attorney, Agent, or Firm* — Lorenz & Kopf, LLP

(57) ABSTRACT

Embodiments of isolators, such as three parameter isolators, including a main spring linear guide system are provided. In one embodiment, the isolator includes first and second opposing end portions, a main spring mechanically coupled between the first and second end portions, and a linear guide system extending from the first end portion, across the main spring, and toward the second end portion. The linear guide system expands and contracts in conjunction with deflection of the main spring along the working axis, while restricting displacement and rotation of the main spring along first and second axes orthogonal to the working axis.

19 Claims, 5 Drawing Sheets

(56) References Cited

U.S. PATENT DOCUMENTS

| | | | |
|---|---|---|---|
| 5,501,434 A | 3/1996 | McGuire | |
| 5,595,270 A | 1/1997 | Braun et al. | |
| 5,788,372 A | 8/1998 | Jones et al. | |
| 5,803,213 A * | 9/1998 | Davis | F16F 9/22 188/298 |
| 5,906,361 A * | 5/1999 | Carranza | F16F 3/02 267/162 |
| 6,135,434 A | 10/2000 | Marking | |
| 6,196,529 B1 | 3/2001 | Shtarkman et al. | |
| 6,942,202 B2 | 9/2005 | Kienholz | |
| 7,182,188 B2 * | 2/2007 | Ruebsamen | F16F 9/361 188/298 |
| 7,188,830 B2 | 3/2007 | Kato et al. | |
| 7,469,910 B2 | 12/2008 | Munster et al. | |
| 7,581,721 B2 | 9/2009 | Kobayashi | |
| 7,665,708 B2 | 2/2010 | Stothers et al. | |
| 8,327,985 B2 * | 12/2012 | Boyd | F16F 9/16 188/298 |
| 2013/0051982 A1 | 2/2013 | Hindle et al. | |
| 2016/0097436 A1 * | 4/2016 | Goold | F16F 15/002 267/140.14 |

OTHER PUBLICATIONS

Scarborough, H. et al. ; "J of Vib Acous," Fluidic Composite Tunable Vibration Isolators, Dec. 28, 2011.

TMC,;"TechnicalKnowledge Base," Precision Vibration Isolation Systems, May 1, 2015.

\* cited by examiner

ISOLATORS INCLUDING MAIN SPRING LINEAR GUIDE SYSTEMS

STATEMENT REGARDING FEDERALLY SPONSORED RESEARCH OR DEVELOPMENT

This invention was made with Government support under Contract No. NNJ06TA25C awarded by NASA Johnson Space Center. The Government has certain rights in the invention.

TECHNICAL FIELD

The present invention relates generally to isolators and, more particularly, to three parameter isolators and other isolators including main spring linear guide systems, which reduce the severity of lateral bending modes induced within the isolator by lateral disturbance forces.

BACKGROUND

Control moment gyroscope arrays, reaction wheel arrays, and other such devices deployed onboard spacecraft for attitude adjustment purposes generate vibratory forces during operation. Vibration isolation systems are commonly employed to minimize the transmission of vibratory forces emitted from such attitude adjustment devices, through the spacecraft body, to any vibration-sensitive components (e.g., optical payloads) carried by the spacecraft. Vibration isolation systems commonly include a number of individual vibration isolators (typically three to eight isolators), which are positioned between the spacecraft payload and the spacecraft body in a multi-point mounting arrangement. The performance of a vibration isolation systems is largely determined by the number of isolators included within the system, the manner in which the isolators are arranged, and the vibration attenuation characteristics of each individual isolator. Vibration isolation system employing three parameter isolators, which behave mechanically as a main spring in parallel with a series-coupled secondary spring and damper, provide superior attenuation of high frequency vibratory forces (commonly referred to as "jitter") as compared to vibration isolation systems employing other types of passive isolators, such as viscoelastic isolators. The three parameter isolators are advantageously implemented as single degree of freedom ("DOF") devices, which provide damping along a single longitudinal axis. An example of a single DOF, three parameter isolator is the D-STRUT® isolator developed and commercially marketed by Honeywell, Inc., currently headquartered in Morristown, N.J.

As noted above, three parameter isolators are commonly designed as single DOF devices. As such, lateral disturbance forces resulting from random vibrations, lateral impacts, or other environmental sources can induce undesired bending modes in the isolator. In many cases, the lateral disturbance forces are minimal and the bending modes are non-problematic or can be addressed by reducing the input forces applied to the isolator. When this is not the case, however, bending modes can occur within the isolator sufficient to induce significant off-axis motion (e.g., lateral and rotational displacements about axes orthogonal to the working axis) in the main spring and other isolator components. Such lateral and rotational displacements can subject the isolator components to undesirably high mechanical stress and rapid fatigue. This can be particularly problematic when the lateral modes are encountered at or near frequencies of particular sensitivity to mission requirements. While the isolator components can be produced to have a greater structural robustness, this typically requires a heavier, bulkier design unfavorable to many airborne and spaceborne applications.

It is thus desirable to provide embodiments of a single-DOF, axial damping isolator, such as a three parameter isolator, having an increased resistivity to off axis motion and, especially, lateral bending modes occurring at lower frequencies at which isolators commonly operate. Ideally, embodiments of such an isolator would be relatively straightforward to manufacture, compact, and lightweight. Other desirable features and characteristics of the present invention will become apparent from the subsequent Detailed Description and the appended Claims, taken in conjunction with the accompanying Drawings and the foregoing Background.

BRIEF SUMMARY

Embodiments of isolators including a main spring linear guide system are provided. In one embodiment, the isolator includes first and second opposing end portions, a main spring mechanically coupled between the first and second end portions, and a linear guide system extending from the first end portion, across the main spring, and toward the second end portion. The linear guide system expands and contracts in conjunction with deflection of the main spring along the working axis, while restricting displacement and rotation of the main spring along first and second axes orthogonal to the working axis.

In a further embodiment, the isolator includes a main spring having a first end and a second end opposite the first end, a first guide member fixedly coupled to the first end of the main spring, and a second guide member fixedly coupled to the second of main spring. A non-sealing sliding interface is formed between the first and second guide members. The non-sealing sliding interface permitting relative movement of the first and second guide members along the working axis, while preventing relative movement of the first and second guide members along a lateral axis perpendicular to the working axis.

In a still further embodiment, the isolator includes inner and outer load paths extending in parallel through the isolator, a main spring positioned in the outer load path, a damper assembly positioned in the inner load path, and a tuning spring positioned in the inner load path. A linear guide system is co-axial with the main spring and extends beyond the main spring in both directions along the working axis. The linear guide system expands and contracts in conjunction with deflection of the main spring along the working axis, while restricting displacement and rotation of the main spring along first and second axes orthogonal to the working axis. The inner load path extends through the linear guide system, while the outer load path may be either radially inboard or radially outboard of the linear guide system.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
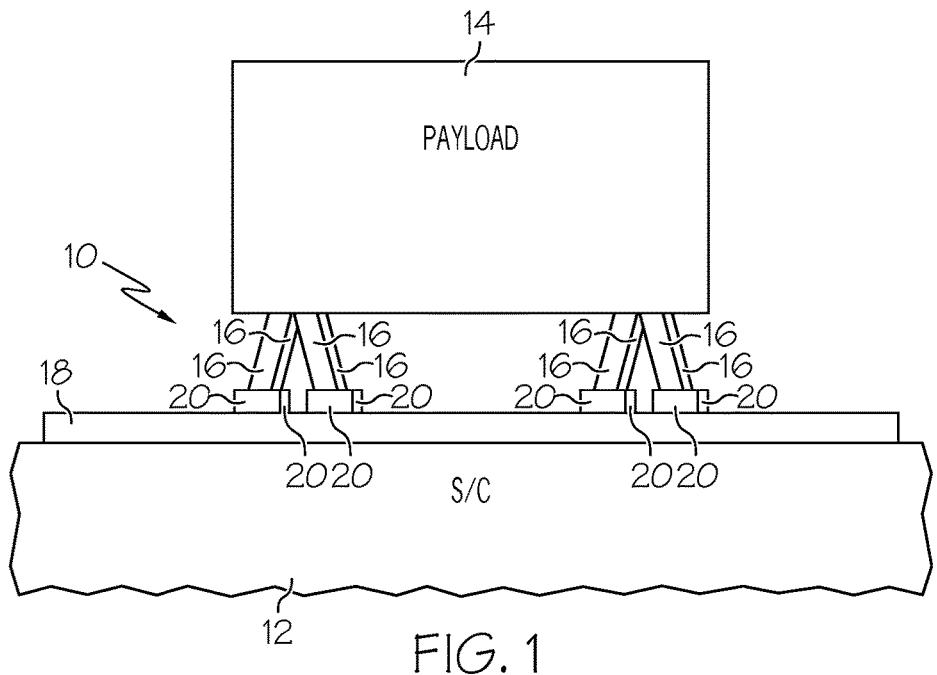
FIG. 1 is simplified schematic of a spacecraft isolation system employing eight isolators suitable for attenuating the transmission of vibrations between a spacecraft and a payload in six degrees of freedom in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description.

The following describes exemplary embodiments of an isolator, such as a three parameter isolator, including a main spring linear guide system; that is, a linear guide system that restricts the off-axis movement of a main spring during operation of the isolator. The linear guide system ideally prevents or at least significantly deters both lateral displacement and rotation of the main spring along axes orthogonal to the working axis of the isolator. In so doing, the linear guide system can greatly reduce lateral modes through the isolator and/or shift the lateral to higher frequencies less critical or immaterial to mission requirements. In preferred embodiments, the isolator is a three parameter isolator including (in addition to the main spring) a secondary or "tuning" spring and a damper assembly, which is coupled in series with the tuning spring and in parallel with the main spring. In certain embodiments, the envelope or axial length of the isolator may be favorably minimized by nesting the tuning spring and/or the series-coupled damper assembly within the linear guide system. The linear guide system may span the length of the main spring, which can be positioned either radially inboard or outboard of the system. In one implementation, the linear guide system includes telescoping cylinders between which sliding movement occurs as the main spring deflects along the working axis. If desired, a plain bearing, a bushing, or a linear bearing system (e.g., one or more rolling element bearings) can be positioned between the sliding interface of telescoping cylinders to reduce friction therebetween. The sliding interface is preferably not exposed to damping fluid or another working fluid (e.g., the gas of a gas spring) and, thus, can remain unsealed such that the pressures on opposing sides of the sliding interface are equivalent. The end result is a highly robust isolator having decreased susceptibility to pronounced lateral modes in the presence of lateral disturbance forces and a relatively compact, lightweight construction.

An exemplary embodiment of a single DOF (axially-damping), three parameter isolator including a main spring linear guide system is described below in conjunction with FIGS. 4-6. First, however, an overarching description of a spacecraft isolation system in provided below in conjunction with FIG. 1, and a general description of three parameter isolators that may be included in the spacecraft isolation system is provided below in conjunction with FIGS. 2 and 3. While described herein primarily in the context of a single DOF, three parameter isolator deployed within a multi-point spacecraft isolation system, it is emphasized that embodiments of the isolator including the damper-external thermal compensator can be implemented as other types of isolators, such as three parameter isolators providing isolation in multiple DOFs and two parameter isolators. Furthermore, embodiments of the below-described isolator can be employed in multi-point isolation systems other than spacecraft isolation systems, such as terrestrial, waterborne, and airborne isolation systems.

FIG. 1 is simplified schematic of a spacecraft isolation system 10 illustrated in accordance with an exemplary embodiment of the present invention and well-suited for reducing the transmission of vibrations from a spacecraft 12, such as a satellite, to a payload 14 carried by spacecraft 12. Isolation system 10 includes a plurality of isolation devices or isolators 16, which are mechanically coupled to and collectively support payload 14. The opposing ends of three parameter isolators 16 are mounted to a spacecraft mounting interface 18 utilizing a plurality of mounting brackets 20. Three parameter isolators 16 are advantageously implemented as single degree-of-freedom dampers, which each provide damping in an axial direction. Isolators 16 are positioned in a multi-point mounting arrangement. In this particular example, isolation system 10 includes eight isolators 16, which are positioned in an octopod mounting arrangement to provide high fidelity damping in six degrees of freedom ("6-DOF"). In further embodiments, isolation system 10 may include a lesser number or a greater number of isolation devices, which may be positioned in other mounting arrangements. For example, in an alternative embodiment, isolation system 10 may include six isolators 16 positioned in a hexapod or Stewart platform-type mounting arrangement.

In certain embodiments, payload 14 may assume the form of a vibration-sensitive component, such as an optical payload or sensor suite; and isolation system 10 may serve to minimize the transmission of vibrations from a vibration-emitting source aboard spacecraft 12, through spacecraft mounting interface 18, and to payload 14. Similarly, as noted above, isolation system 10 may serve to minimize the transmission of impact forces through spacecraft mounting interface 18 and to payload 14 during spacecraft launch. In other embodiments, payload 14 may include one or more vibration-emitting devices, and isolation system 10 may serve to reduce the transmission of vibrations from payload 14 to spacecraft 12 and any vibration-sensitive components deployed thereon. In this latter regard, payload 14 may include one or more rotational devices utilized in the attitude adjustment of spacecraft 12, such as one or more reaction wheels or control moment gyroscopes.

Figure 2:
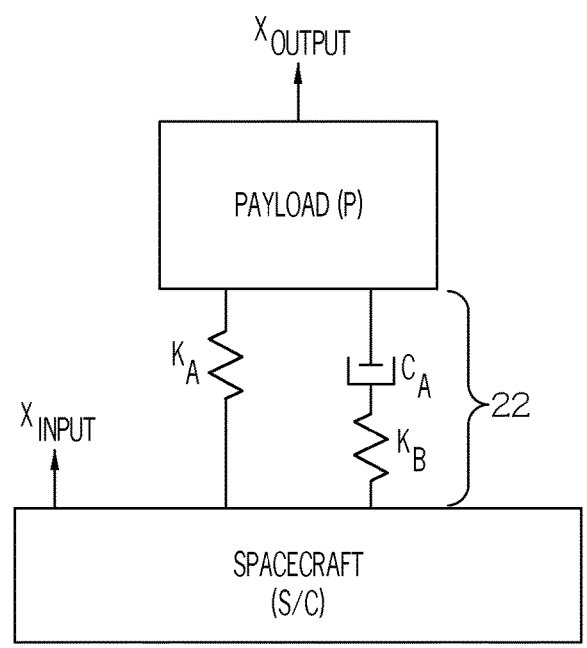
FIG. 2 is a schematic of an exemplary three parameter vibration isolator illustrated in accordance with the teachings of prior art.

FIG. 2 is a schematic representation of an exemplary three parameter isolator 22 mechanically coupled between a payload "P" and a spacecraft "S/C" and illustrated in accordance with the teachings of prior art. As modeled in FIG. 2, three parameter isolator 22 includes the following mechanical elements or components: (i) a first spring component $K_A$, which is mechanically coupled between payload P and a host spacecraft S/C; (ii) a second spring component $K_B$, which is mechanically coupled between payload P and spacecraft S/C in parallel with first spring component $K_A$; and (iii) a damper $C_A$, which is mechanically coupled between payload P and spacecraft S/C in parallel with the first spring component $K_A$ and in series with the second spring component $K_B$. Transmissibility of three parameter isolator 22 is expressed by the following equation:

$$T(\omega) = \frac{X_{output}(\omega)}{X_{input}(\omega)} \qquad \text{EQ. 1}$$

wherein T(ω) is transmissibility, $X_{output}(\omega)$ is the output motion of payload P, and $X_{input}(\omega)$ is the input motion imparted to isolator 22 by spacecraft S/C.

Figure 3:
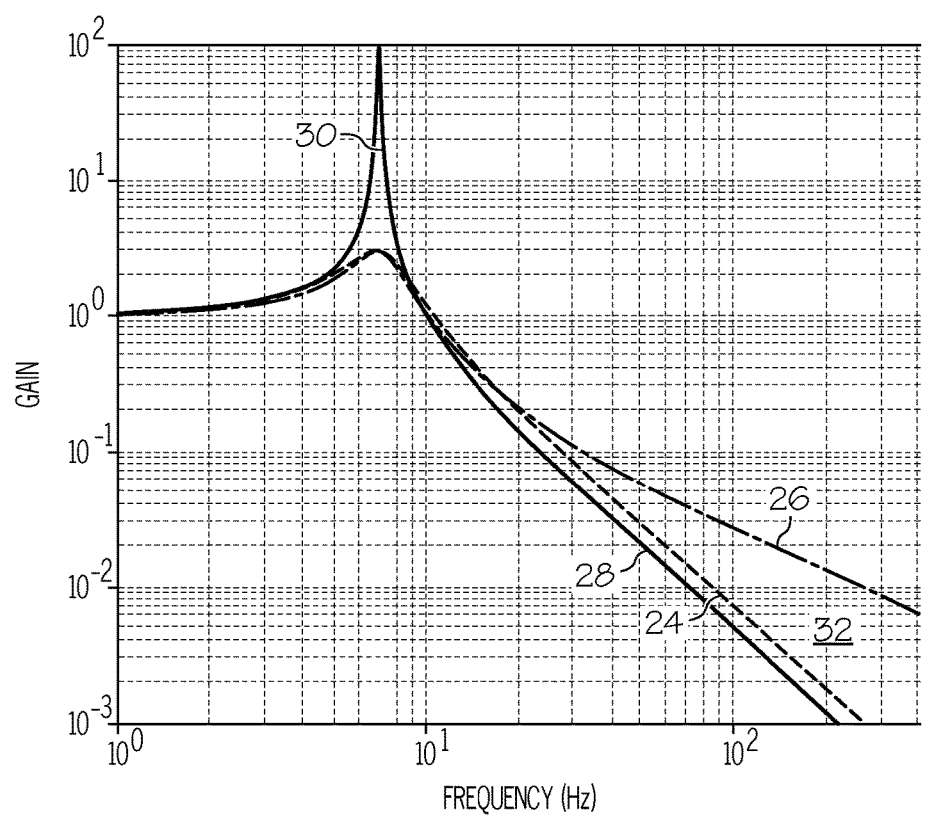
FIG. 3 is a transmissibility plot of frequency (horizontal axis) versus gain (vertical axis) illustrating the transmissibility profile of the three parameter isolator shown in FIG. 2 as compared to the transmissibility profiles of a two parameter isolator and an undamped device.

FIG. 3 is a transmissibility plot illustrating the damping characteristics of three parameter isolator 22 (curve 24) as compared to a two parameter isolator (curve 26) and an undamped device (curve 28). As indicated in FIG. 3 at 30, the undamped device (curve 28) provides an undesirably high peak gain at a threshold frequency, which, in the illustrated example, is moderately less than 10 hertz. By comparison, the two parameter device (curve 26) provides a significantly lower peak gain at the peak frequency, but an undesirably gradual decrease in gain with increasing frequency after the threshold frequency has been surpassed (referred to as "roll-off"). In the illustrated example, the roll-off of the two parameter device (curve 26) is approximately −20 decibel per decade ("dB/decade"). Lastly, the three parameter device (curve 24) provides a low peak gain substantially equivalent to that achieved by the two parameter device (curve 26), as indicated in FIG. 3 by horizontal line 34, and further provides a relatively steep roll-off of about −40 dB/decade. The three parameter device (curve 24) thus provides a significantly lower transmissibility at higher frequencies, as quantified in FIG. 3 by the area 32 bound by curves 24 and 26. By way of non-limiting example, further discussion of three parameter isolators can be found in U.S. Pat. No. 5,332,070, entitled "THREE PARAMETER VISCOUS DAMPER AND ISOLATOR," issued Jan. 26, 1974; and U.S. Pat. No. 7,182,188 B2, entitled "ISOLATOR USING EXTERNALLY PRESSURIZED SEALING BELLOWS," issued Feb. 27, 2007; both of which are assigned to assignee of the instant application.

Figure 4:
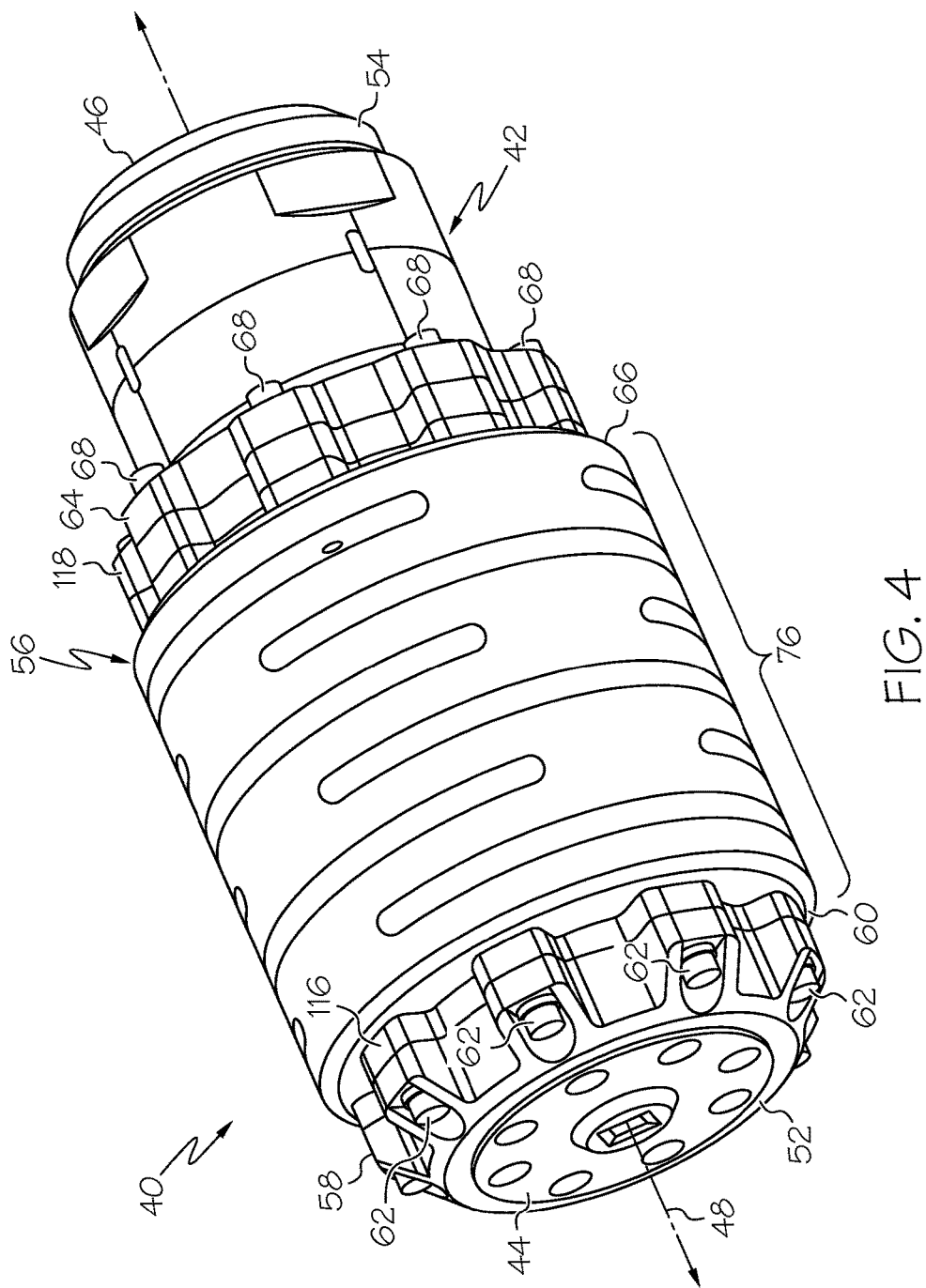
FIGS. 4, 5, and 6 are isometric, cross-sectional, and exploded views, respectively, of an exemplary three parameter isolator suitable for usage as one or all of the isolation devices shown in FIG. 1 and including a main spring linear guide system, as illustrated in accordance with an exemplary embodiment.
Figure 5:
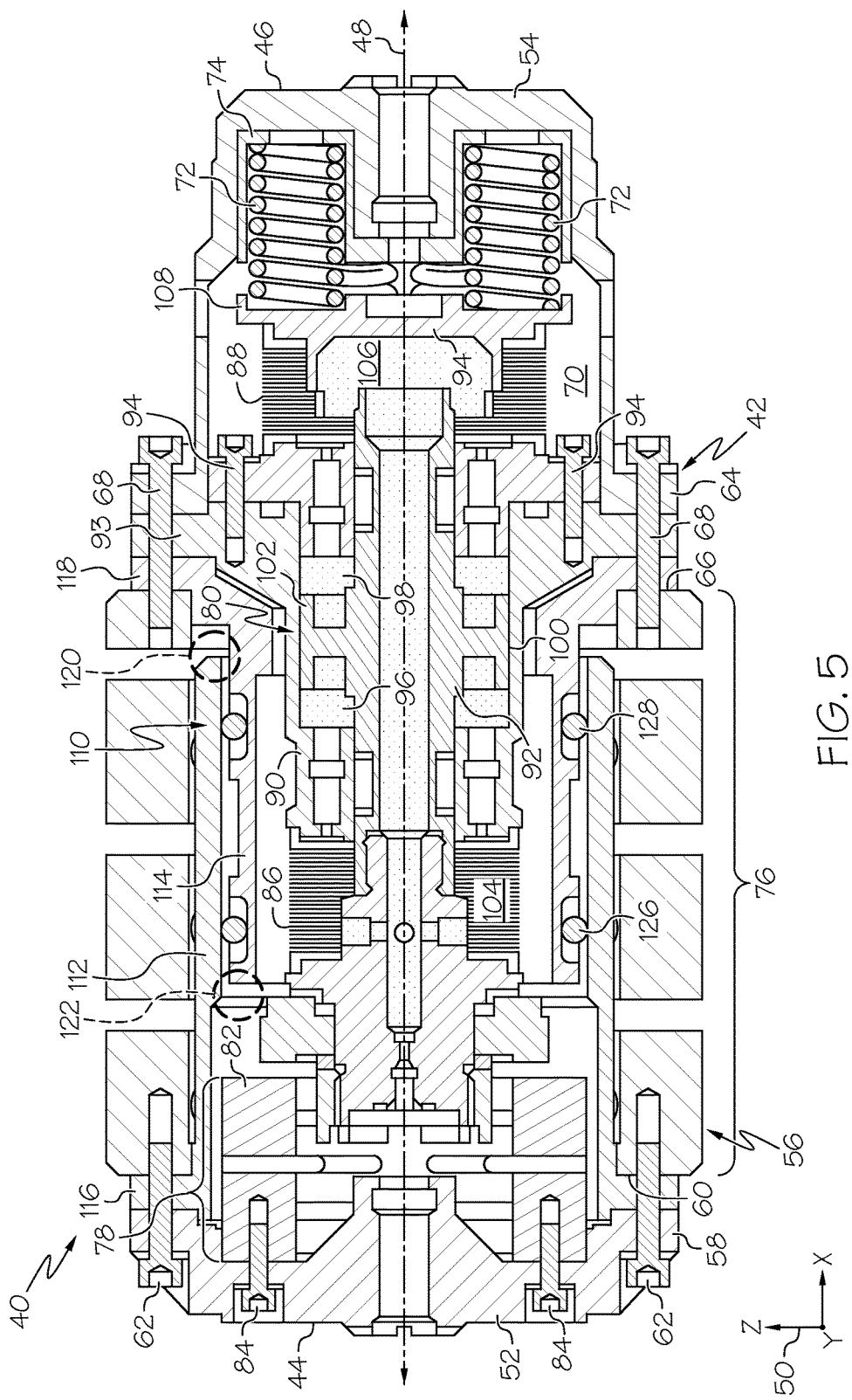
Figure 6:
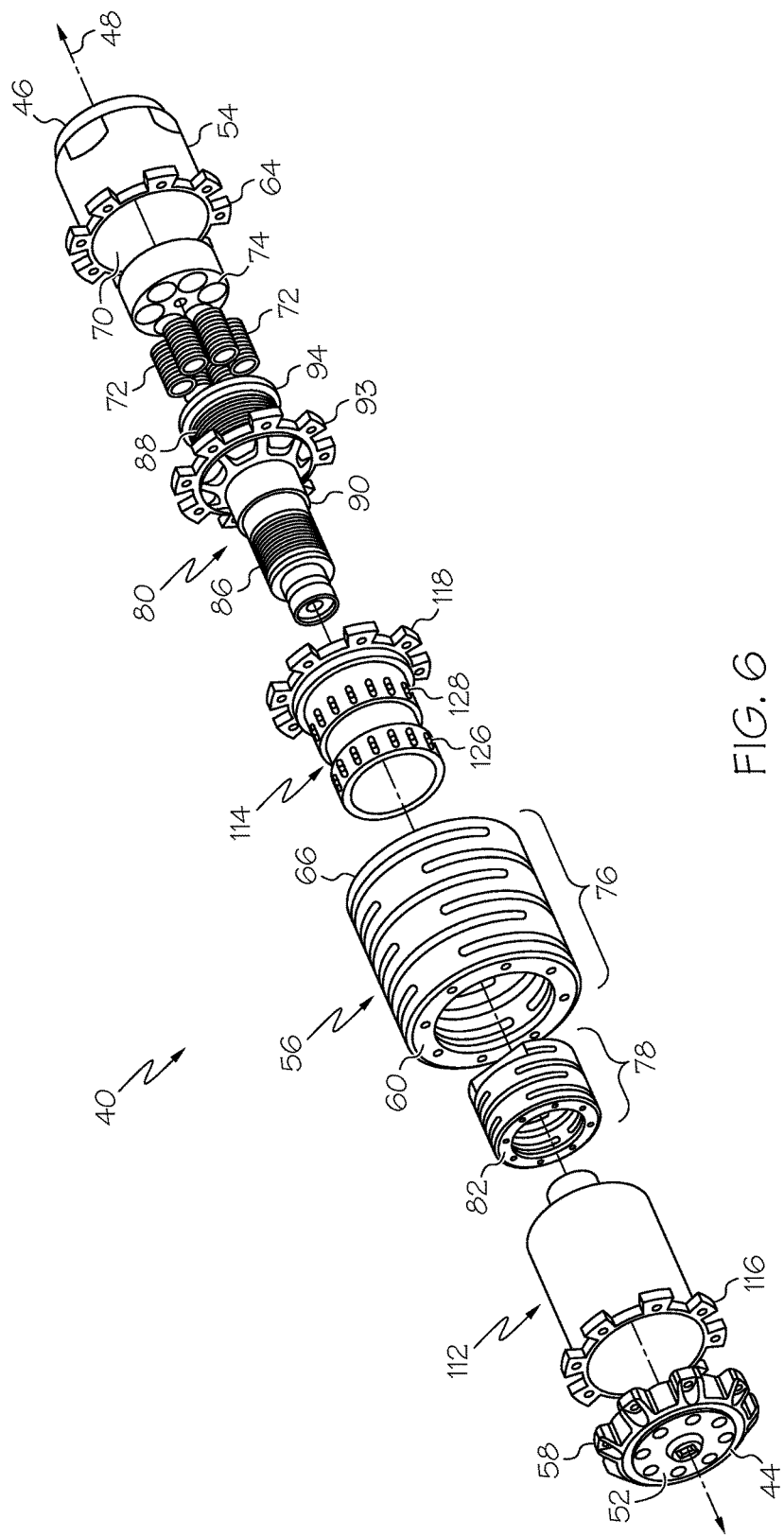

FIGS. 4, 5, and 6 are isometric, cross-sectional, and exploded views, respectively, of an exemplary embodiment of a three parameter isolator 40 suitable for usage as one or all of three parameter isolators 16 shown in FIG. 1. Exemplary three parameter isolator 40 includes a first end portion 44 and a second, opposing end portion 46. End portions 44 and 46 are spaced along the longitudinal or working axis of isolator 40, which is represented in FIGS. 4-6 by double-headed arrow 48 and corresponds to the X-axis identified in FIG. 5 by coordinate legend 50. End portions 44 and 46 serve as opposing mechanical inputs/outputs of three parameter isolator 40. When isolator 40 is deployed within a spacecraft isolation system, first end portion 44 can be mounted directly or indirectly to the host spacecraft (e.g., utilizing a mounting bracket 20, as shown in FIG. 1), while second end portion 46 of isolator 40 is attached directly or indirectly to the spacecraft payload (e.g., second end portion 46 may be bolted to or otherwise attached to a bench or palette supporting the spacecraft payload). Alternatively, the orientation of isolator 16 may be inverted such that second end portion 46 is mounted directly or indirectly to the host spacecraft, while first end portion 44 is secured to the spacecraft payload. The foregoing is provided by way of example only with the understanding that isolator 40 is not restricted to usage exclusively within spacecraft isolation systems.

Three parameter isolator 40 further includes an isolator housing 42 (identified in FIGS. 4 and 5), which can be assembled from any number of discrete components or pieces. In the illustrated example, specifically, isolator housing 42 includes two end caps 52 and 54, which are affixed to opposing ends of an axially-elongated, tubular housing piece 56. End cap 52 has a generally flat, disc-like geometry and includes an outer peripheral flange 58 having a number of fastener openings therethrough. When three parameter isolator 40 is assembled, a number of fasteners (e.g., bolts 62 shown in FIGS. 4 and 5) are received through the outer ring of fastener openings to affix flange 58 of end cap 52 to a first end 60 of tubular housing piece 56. End cap 52 likewise includes a peripheral flange 64, which is affixed to the opposing end 66 of tubular housing 56 utilizing a second set of bolts 68 (FIGS. 4 and 5). However, in contrast to end cap 52, end cap 54 has a tubular or cup-like body, which partially encloses a cylindrical cavity 70. When isolator 40 is assembled, and as shown most clearly in FIG. 5, cavity 70 houses an annular grouping of preload springs 72 (a subset of which are labeled in FIGS. 5 and 6), an associated spring retainer 74, and an end portion of a damper assembly 80 further included within isolator 40, as described in more detail below.

Three parameter isolator 40 generally includes three active components or devices: (i) a primary or main spring 76, (ii) a secondary or "tuning" spring 78, and (iii) a damper assembly 80. In preferred embodiments, and as indicated in FIGS. 4-6, main spring 76 may be integrally formed in the annular body of tubular housing piece 56 by machining. For example, main spring 76 may assume the form of a section of tubular housing piece 56 from which material has been removed utilizing laser cutting or a similar process to form a compressible resilient structure. In other embodiments, main spring 76 may be a discrete or independent element, such as a coil spring disposed between opposing end portions 44 and 46 of isolator 40. Secondary spring 78 can also be a coil spring or other discrete, compressible structure, but is also preferably implemented as a machined spring. For example, as shown in FIGS. 5 and 6, secondary spring 78 can be a machined spring formed in the outer annular wall of a tubular connector piece 82 contained within isolator housing 42 and, specifically, within the central cavity of tubular housing piece 56. When isolator 40 is assembled, a first end of tubular connector piece 82 may be affixed to end cap 52 utilizing, for example, a plurality of bolts 84 (identified in FIG. 5) or other such fasteners. Conversely, the second, opposing end of tubular connector piece 82 may be attached to a mating end portion of damper assembly 80 utilizing, for example, an annular bonding or threaded attachment interface.

It will be appreciated that, unless otherwise specified, the particular design of damper assembly 80 can vary amongst embodiments of isolator 40. However, for completeness, a brief description of exemplary damper assembly 80 will be provided herein. As shown most clearly in FIGS. 5 and 6, damper assembly 80 includes: (i) internally-pressurized bellows 86 and 88, (ii) a damper assembly sub-housing 90, and (iii) a piston assembly 92 resiliently coupled to sub-housing 90 through bellows 86 and 88. As noted above, piston assembly 92 is affixed to tubular connector piece 82 in which tuning spring 78 is formed. Conversely, damper assembly sub-housing 90 is produced to include a peripheral flange 93, which is fixedly coupled to end cap 46 and second end 66 of tubular housing piece 56 utilizing, for example, a plurality of bolts 94. Piston assembly 92 can thus slide with respect to damper assembly sub-housing 90 along the working axis 48 of isolator 40. Bellows 86 expands and contracts as piston assembly 92 and, more generally, three parameter isolator 40 strokes. Bellows 88, by comparison, will expand and contract in relation to the volumetric ratio between bellows 86 and 88, as well as changes in damping fluid volume due to temperature fluctuations. Bellows 86 and 88 are preferably metal bellows, such as edge welded metal bellows; and, in further embodiments of damper assembly 80, either or both of bellows 86 and 88 may be externally pressurized.

As further shown in FIG. 5, hydraulic chambers 96 and 98 are provided within sub-housing 90. Hydraulic chambers 96 and 98 are fluidly partitioned, in part, by a piston member 102 of piston assembly 92. Fluid communication is permitted between hydraulic chambers 96 and 98, however, through a restricted orifice and, in particular, through an annulus 100 defined by the outer circumferential surface of piston member 102 and the inner circumferential surface of sub-housing 90. Additional hydraulic chambers 104 and 106 are provided within the interior of bellows 86 and 88, respectively. Hydraulic chamber 106, specifically, is enclosed by bellows 88, an end of sub-housing 90, and a floating bellows cup 108. Preload springs 72 contact the face of bellows cup 108 opposite bellows 88 to exert a preload on cup 108 and pressurize the hydraulic fluid within damper assembly 80. During operation of isolator 40, damping fluid (e.g., a silicone-based damping fluid) is exchanged between the various chambers of damper assembly 80 and forced through annulus 100 as piston assembly 92 strokes relative to damper assembly sub-housing 90 to provide the desired damping effect. Additionally, hydraulic chamber 106, bellows 88, and preload springs 72 may collectively serve as a thermal compensation device to help compensate for thermally-inducted fluctuations in damping fluid volume. Isolator 40 may initially be distributed without damping fluid, in which case damper assembly 80 may be filled with a selected damping fluid prior to deployment utilizing, for example, a non-illustrated fill port.

As previously indicated, exemplary vibration isolator 40 is a three parameter device, which provides the desirable vibration attenuation characteristics described above; e.g., a relatively low peak transmissibility and superior attenuation of high frequency vibrations. In keeping with the terminology introduced above in conjunction with FIGS. 2 and 3, $K_A$ is the axial stiffness of three parameter isolator 40, as a whole, which is predominately determined by the axial stiffness of main spring 76; $K_B$ is the volumetric stiffness of isolator 40, which is predominately determined by the axial stiffness of secondary spring 78; and $C_A$ is determined by the damping characteristics of damper assembly 80. In the exemplary embodiment shown in FIGS. 4-6, main spring 76 ($K_A$) is coupled in parallel with secondary spring 78 ($K_B$) and damper assembly 80 ($C_A$), which are coupled in series, as taken along a load transfer path extending through isolator 40. The instant example notwithstanding, vibration isolator 40 need not be a three parameter isolator in all embodiments and, in certain embodiments, may instead assume the form of a single degree of freedom, axially-damping, two parameter isolator including a main spring (e.g., spring 76) in parallel with the damper (e.g., damper assembly 80), but lacking a secondary spring (e.g., spring 78) in parallel with the main spring and in series with the damper.

Three parameter isolator 40 is a single-DOF, axial damping device designed to provide vibration attenuation along working axis 48, which corresponds to the X-axis identified by coordinate legend 50 (FIG. 5). The axes orthogonal to working axis 48 are referred to herein as the "lateral" or "radial" axes and corresponding to the Y- and Z-axes further identified by coordinate legend 50 (FIG. 5). In certain applications, lateral disturbance forces can induce high-amplitude bending modes in vibration isolators along the lateral axes. As previous described, bending modes can cause significant mechanical stress and possibly damage the components of the isolator absent the provision of adequate countermeasures. Additionally, in certain cases, the lateral modes may be at or near one or more frequencies of particular sensitivity to mission requirements. In such a case, it may be beneficial to effectively shift the lateral bending mode(s) of isolator 40 to higher frequencies less pertinent to or immaterial to mission requirements. In this regard, three parameter isolator 40 is further equipped with a linear guide system 110, which guides the movement of main spring 76 during operation of isolator 40. Specifically, linear guide system 40 prevents or at least significantly deters undesired, off-axis movement of main spring 76; that is, displacement and rotation of main spring 76 along the lateral axes (the Y- and Z-axes in coordinate legend 50) orthogonal to working axis 48. It is also possible for linear guide system 110 to restrict or prevent rotational of main spring 76 about working axis 48 in certain embodiments; however, this will often be unnecessary as rotation about axis 48 is not problematic in many applications. Finally, linear guide system 110 may also, as a secondary benefit, likewise help guide the movement of tuning spring 82 and damper assembly 80 by further restricting the motion of these components to axial movement along working axis 48.

Linear guide system 110 can assume any form suitable for preventing or at least greatly reducing the lateral or off-axis motion of main spring 76 during operation of isolator 40. In many embodiments, linear guide system 110 (identified in FIG. 5) will include at least a first guide member 112 and a second guide member 114, which engage each other in a sliding relationship such that guide system 110 can expand and contract in conjunction with deflection of main spring 76 along working axis 48. In preferred embodiments, and as indicated in FIGS. 4-6, guide members 112 and 114 assume the form generally cylindrical bodies, which are coaxial and substantially concentric with one another, with working axis 48 of isolator 40, and which tubular housing piece 56/main spring 76. Furthermore, the tubular bodies of guide members 112 and 114 matingly engage in a telescopic relationship. Specifically, guide member 112 is received by an open end of guide member 114 such that member 112 is partially inserted into and circumscribed by member 114. Guide member 112 is fixedly coupled to end 60 of tubular housing piece 56 and, therefore, to a first end of main spring 76. For example, as shown in FIGS. 5 and 6, guide member 112 may include an outer peripheral flange 116, which extends from the tubular body of member 112 and is captured between flange 58 of end cap 52 and end 60 of tubular housing piece 56 when isolator 40 is assembled. Similarly, guide member 114 may include a peripheral flange 118, which extends from the tubular body of member 114 and is captured between flange 93 of damper assembly 80 and opposing end 66 of tubular housing piece 56 when isolator 40 is assembled. In further embodiments, guide members 112 and 114 can assume other structural forms and may be fixedly coupled to opposing end portions of isolator 40 and, perhaps, to opposing ends of tubular housing piece 56/main spring 76 utilizing a different attachment technique or device.

Guide members 112 and 114 are thus fixedly coupled to the opposing end portions of three parameter isolator 40 between which tubular housing piece 56 and, therefore, main spring 76 extends. Furthermore, as can be seen most readily in FIG. 5, the tubular body of guide member 112 extends toward the opposing end portion of isolator 40 and, specifically, toward flange 118 of guide member 114, but remains separated therefrom by a first axial gap or annular clearance (called-out by circle 120 in FIG. 5). The tubular body of guide member 114 likewise extends toward the opposing end portion of isolator 40 and, specifically, toward flange 116 of guide member 112, but is separated therefrom by a second axial gap or annular clearance (called-out by circle 122 in FIG. 5). These axial gaps or annular clearances enable relative axial movement between guide members 112 and 114, and therefore the axial expansion and contraction of linear guide system 110, as main spring 76 deflects along working axis 48.

An annular or tubular sliding interface is further formed between guide members 112 and 114 to prevent relative displacement or rotation of members 112 and 114, and therefore main spring 76, along the lateral axes orthogonal to working axis 48. The sliding interface formed between guide members 112 and 114 can be provided as a plain bearing or bushing having a generally annular or tubular geometry. For example, in an embodiment, the inner circumferential surface of guide member 112 may contact the outer circumferential surface of guide member 114 to form a plain annular bearing along which relative sliding motion occurs. In this case, one or both of the contacting surfaces can be coated with a low friction material (e.g., a polytetrafluoroethylene coating) to reduce stiction. In embodiments wherein three parameter isolator 40 desirably reacts to low amplitude vibrations, however, still further reductions in stiction may be desired. In this case, a linear bearing system can be provided at the sliding interface between members 112 and 114. For example, as shown in FIGS. 5 and 6, a number of annular linear bearing 126 and 128 may be provided, each including a plurality of rolling elements (e.g., rollers or balls) uniformly distributed around the centerline of isolator 40 and linear guide system 110 between members 112 and 114. In this particular example, the spherical rolling elements are retained in slots provided in inner guide member 114 by a number of magnets, which are interspersed with the rolling elements and shown most clearly in FIG. 6. In further embodiments, other types of rolling-element linear bearings can be utilized. By integrating a plurality of linear bearings into linear guide system 110, multiple low friction points-of-contact between guide members 112 and 114 spaced along the working axis or centerline 48 of isolator 40 are provided. In this manner, the linear bearing system further prevents or deters off-axis rotation of main spring 76 about the lateral axes orthogonal to working axis 48.

By virtue of the above-described structural configuration, linear guide system 110 provides a high axial compliance, while also providing high stiffnesses in the lateral directions (again, corresponding to the Y- and Z-axes identified by coordinate legend 50). In this manner, linear guide system 110 can be substantially transparent to the normal operation of three parameter isolator 40, while also minimizing lateral or off-axis motion of main spring 76 to eliminate or reduce higher order bending modes of isolator 40 over the frequency range of interest. In this regard, it may be noted that three parameter isolator 40 can still provide its basic vibration attenuation function absent linear guide system 110, albeit with an increased propensity toward pronounced lateral modes inducted by random vibrations, lateral impacts, and other lateral disturbance forces. This is pointed-out to help distinguish isolator 40 and linear guide system 110 from commonplace dampers with telescoping members, such as vehicular shock absorber. Here, it is emphasized that linear guide system 110 is not exposed to a damping fluid, the gas of a gas spring (noting that isolator 40 lacks any gas springs), or any other working fluid. Furthermore, as guide member 112, guide member 114, the sliding interface therebetween, and any linear bearings (if provided) are not exposed to a working fluid, these components need not provide any sealing function and may thus be referred to herein as "non-sealing," as may guide system 110 generally. The term "non-sealing," as appearing herein, is therefore expressly defined as describing a structural component or interface that does not contain a pressurized fluid, whether gas or liquid. This term expressly excludes those components exposed to the gas of a gas spring or to the damping fluid of a fluid damper. Accordingly, fluid communication will typically be permitted across the linear sliding interface and any linear bearings (if provided) such that the pressures on opposing sides of these structural components are equivalent. For example, it may be stated that guide members 112 and 114 define an inner channel or passage, which fluid communicates with the exterior of isolator 40 and through which secondary spring 78 and damper assembly 80 extend.

It should thus be appreciated linear guide system 110 greatly reduces lateral bending modes of three parameter isolator 40 in the presence of lateral disturbance forces and/or shifts the lateral modes to higher frequencies less critical or immaterial to mission requirements. As a further advantage, the envelope or axial length of isolator 40 can be favorably minimized by partially or fully nesting tuning spring 78 and/or series-coupled damper assembly 80 within linear guide system 40 itself. This may be appreciated by again referring to FIGS. 4-6 and specifically FIG. 5 wherein it can be seen that tubular connector piece 82 and tuning spring 78 are partially nested within and circumscribed by guide member 112 of linear guide system 110. Similarly, a substantial portion of damper assembly 80 is nested within and circumscribed by the tubular body of guide member 114, which is, in turn, circumscribed by the tubular body of guide member 112. It can also be seen in FIG. 5 that damper assembly 80 extends from one end of guide member 114, through guide member 114, and toward the opposing end of guide member 114 for mechanical connection to tubular connector piece 82 and tuning spring 78. Stated differently, the joinder interface between damper assembly 80 and tuning spring 78 is located within or inboard of linear guide system 110; and damper assembly 80 and tuning spring 78, considered collectively, extend beyond guide system 110 in both axial directions taken along working axis 48. The inner load path of isolator 40 (that is, the $K_B$-$C_A$ load path) thus extends through linear guide system 110 between the opposing ends of isolator 40. Finally, it will be noted that the outer load path (that is, the $K_A$ load path) further extends around and circumscribes linear guide system 110 in the illustrated example. However, in further embodiments, linear guide system 110 can be disposed outboard of main spring 76 such that the outer load path (the $K_A$ load path) further extends through system 110. In either case, main spring 76 is preferably disposed radially adjacent linear guide system 110.

An exemplary embodiment of a three parameter isolator including a main spring linear guide system has thus been provided. Advantageously, the linear guide system prevents or at least significantly deters both lateral displacement and rotation of the main spring along axes orthogonal to the working axis of the isolator. In so doing, the guide system can greatly reduce lateral modes through the isolator and/or shift the lateral to higher frequencies less critical or immaterial to mission requirements. Additionally, the envelope or axial length of the isolator can be minimized by nesting the tuning spring and/or the series-coupled damper assembly within the guide system itself. The main spring linear guide system may span the length of the flexible portion of the isolator and the main spring, which can be positioned either radially inboard or outboard of the guide system. Additionally, in preferred embodiments, the linear guide system is non-sealing and fluidly isolated from the damper assembly; that is, no portion of the guide system is exposed to or touches the damping fluid contained within the damper assembly. The end result in a highly robust isolator having decreased susceptibility to pronounced lateral modes in the presence of lateral disturbance forces and a relatively compact, lightweight construction.

In the above-described exemplary embodiment, the linear guide system included two mating guide members in the form of two telescoping tubes or a sleeve-shaft configuration. The telescoping tubes are fixedly coupled to opposing ends of the main spring and, thus, slide relative to one another as the main spring and, more generally, the isolator deflects (compresses and expands) along the working axis. The foregoing example notwithstanding, the linear guide system can be implemented in other manners, as well. For example, it is possible for the linear guide system to include a single guide member that forms a sliding interface with the main spring itself to restrict undesired off-axis motion of the main spring. In such embodiments, the guide member can be disposed either radially inboard or outboard of the main spring, and various bearings or bearing systems can be integrated into either the main spring or the guide member. In further embodiments, the main spring linear guide system can include still other types of guide members, which can vary in number and structural configuration. For example, a plurality of pins circumferentially spaced about the working axis can be affixed to one end of the main spring or isolator; while a plurality of tubes, sleeves, or slotted members are affixed to the opposing end of the main spring or isolator. The pins may be received by and slide relative to the tubes, sleeves, or slotted members as the main spring deflects along the working axis to prevent displacement and rotation of the main spring along first and second axes orthogonal to the working axis. Such an arrangement also deters rotation of the main spring about the working axis itself, which may be a desirable characteristic in certain applications.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. An isolator having a working axis, the isolator comprising:
   first end portion;
   a second end portion spaced from the first end portion along the working axis;
   a main spring mechanically coupled between the first and second end portions;
   a linear guide system extending from the first end portion, across the main spring, and toward the second end portion, the linear guide system extending and retracting in conjunction with deflection of the main spring along the working axis, while restricting displacement and rotation of the main spring along first and second axes orthogonal to the working axis;
   a damper assembly mechanically coupled between the first and second end portions in parallel with the main spring, the damper assembly at least partially nested within the linear guide system; and
   a tuning spring mechanically coupled in parallel with the main spring and in series with the damper assembly, the tuning spring at least partially nested within the linear guide system.

2. The isolator of claim 1 wherein the damper assembly retains a volume of damping fluid during operation of the isolator, and wherein the linear guide system is fluidly isolated from the damping fluid.

3. The isolator of claim 1 wherein the main spring circumscribes at least a majority of the linear guide system.

4. The isolator of claim 1 wherein the linear guide system comprises a first tubular body fixedly coupled to the first end portion of the isolator and extending toward the second portion of the isolator, but separated therefrom by an axial gap.

5. The isolator of claim 4 wherein the main spring comprises first and second opposing ends, wherein the first tubular body is fixedly coupled to the first end of the main spring, and wherein relative displacement along the working axis occurs between first tubular body and the second end of the main spring as the main spring deflects along the working axis.

6. The isolator of claim 4 wherein the main spring and the first tubular body are coaxial and substantially concentric.

7. The isolator of claim 4 wherein the first tubular body is disposed radially adjacent the main spring.

8. The isolator of claim 4 further comprising a second tubular body affixed to the second end portion of the isolator and extending toward the first end portion of the isolator, but separated therefrom by a second axial gap.

9. The isolator of claim 8 wherein a portion of the first tubular body is telescopically received within the second tubular body, and wherein an annular sliding interface is formed between the first and second tubular bodies.

10. The isolator of claim 9 further comprising a first annular linear bearing disposed between the first and second tubular bodies and extending around the annular sliding interface.

11. The isolator of claim 10 further comprising a second annular linear bearing disposed between the first and second tubular bodies and extending around the annular sliding interface, the first and second annular linear bearings longitudinally spaced apart along the working axis.

12. The isolator of claim 1 wherein the linear guide system is non-sealing.

13. An isolator having a working axis, the isolator comprising:
   first end portion;
   a second end portion spaced from the first end portion along the working axis;
   a main spring mechanically coupled between the first and second end portions;
   a linear guide system extending from the first end portion, across the main spring, and toward the second end portion, the linear guide system extending and retracting in conjunction with deflection of the main spring along the working axis, while restricting displacement and rotation of the main spring along first and second axes orthogonal to the working axis;

an outer load path extending from the first end portion to the second end portion, the outer load path extending through the main spring; and an inner load path extending from the first end portion to the second end portion, the inner load path bypassing the main spring and parallel to the outer load path;

wherein the inner load path extends through the main spring and through the linear guide system.

14. The isolator of claim 13 wherein the main spring has first end and a second opposing end, and wherein the linear guide system comprises:

a first guide member fixedly coupled to the first end of the main spring;

a second guide member fixedly coupled to the second end of the main spring; and a sliding interface formed between the first and second guide members.

15. The isolator of claim 14 wherein the first guide member engages the second guide member at multiple points of contact along the sliding interface, the multiple points of contact spaced along the working axis.

16. The isolator of claim 14 further comprising a tubular housing piece in which the main spring is formed, the tubular housing piece circumscribing at least one of the first and second guide members.

17. The isolator of claim 13 further comprising a tuning spring mechanically coupled between the first and second end portions of the isolator, the inner load path extending through the tuning spring.

18. The isolator of claim 17 further comprising a damper assembly mechanically coupled between the first and second end portions of the isolator, the damper assembly positioned in the inner load path in series with the tuning spring.

19. An isolator having a working axis, the isolator comprising:

inner and outer load paths extending in parallel through the isolator;

a main spring positioned in the outer load path;

a damper assembly positioned in the inner load path;

a tuning spring positioned in the inner load path; and a linear guide system coaxial with the main spring and extending beyond the main spring in both directions along the working axis;

wherein the linear guide system expands and contracts in conjunction with deflection of the main spring along the working axis, while restricting displacement and rotation of the main spring along first and second axes orthogonal to the working axis; and wherein the inner load path extends through the linear guide system.

* * * * *